United States Patent
Jakkula et al.

(10) Patent No.: US 7,232,935 B2
(45) Date of Patent: Jun. 19, 2007

(54) PROCESS FOR PRODUCING A HYDROCARBON COMPONENT OF BIOLOGICAL ORIGIN

(75) Inventors: Juha Jakkula, Kerava (FI); Vesa Niemi, Porvoo (FI); Jouko Nikkonen, Hamari (FI); Veli-Matti Purola, Hamari (FI); Jukka Myllyoja, Vantaa (FI); Pekka Aalto, Porvoo (FI); Juha Lehtonen, Porvoo (FI); Ville Alopaeus, Helsinki (FI)

(73) Assignee: Fortum OYJ, Espoo (FI)

( * ) Notice: Subject to any disclaimer, the term of this patent is extended or adjusted under 35 U.S.C. 154(b) by 585 days.

(21) Appl. No.: 10/655,533

(22) Filed: Sep. 5, 2003

(65) Prior Publication Data

US 2004/0230085 A1  Nov. 18, 2004

Related U.S. Application Data

(60) Provisional application No. 60/408,301, filed on Sep. 6, 2002.

(51) Int. Cl.
C07C 1/20 (2006.01)
(52) U.S. Cl. .............. 585/240; 585/241; 208/179

(58) Field of Classification Search .......... 585/240, 585/241; 208/179
See application file for complete search history.

(56) References Cited

U.S. PATENT DOCUMENTS

| 5,183,556 A | 2/1993 | Reilly et al. |
| 5,705,722 A | 1/1998 | Monnier et al. |
| 2001/0027937 A1 | 10/2001 | Tsao et al. |

FOREIGN PATENT DOCUMENTS

| FI | 100248 B | 10/1997 |
| GB | 1 524 781 | 9/1978 |
| WO | WO 92/16601 A1 | 10/1992 |

OTHER PUBLICATIONS

DATABASE WPI, Section Ch, Week 199749, Derwent Publications Ltd., London, GB, AN 1997-488372, XP 002267286 & FI 100 248 B (Neste Oy), Oct. 31, 1997.

Primary Examiner—Tam M. Nguyen
(74) Attorney, Agent, or Firm—Birch, Stewart, Kolasch & Birch, LLP (57) ABSTRACT

The invention relates to a process for producing a hydrocarbon component of biological origin. The process comprises at least two steps, the first one of which is a HDO step and the second one is an isomerization step operated using the counter-current flow principle. A biological raw material containing fatty acids and/or fatty acid esters serves as the feed stock.

35 Claims, 5 Drawing Sheets

PROCESS FOR PRODUCING A HYDROCARBON COMPONENT OF BIOLOGICAL ORIGIN

This Nonprovisional application claims priority under 35 U.S.C. 119(e) on U.S. Provisional Application No(s). 60/408,301 filed on Sep. 6, 2002, the entire contents of which are hereby incorporated by reference.

TECHNICAL FIELD

The invention relates to an improved process for producing a hydrocarbon component of biological origin from biological starting materials such as vegetable oils, animal fats and similar materials, this component being particularly useful in diesel fuels.

PRIOR ART

Ever increasing interest is directed to the use of hydrocarbon components of biological origin in fuels since renewable biological starting materials that may replace fossil ones are available, and the use thereof is desirable. One of the aims is also to promote the exploitation of wastes containing biological raw materials like animal carcasses. Several prior art processes for producing fuels from starting materials originating from plants and animals are known.

FI 100248 discloses a two-step process for producing middle distillate from vegetable oil by hydrogenating the fatty acids or triglycecides of the vegetable oil to give n-paraffins and then by isomerizing said n-paraffins to obtain branched-chain paraffins. It was possible to improve the low temperature performance of the hydrocarbon component produced by hydrogenating and isomerizing according to this process. The product is proven useful in solvents and as a diesel fuel component without any blending restrictions.

Conversion of biomass feed stock is known from the document U.S. Pat. No. 5,705,722 disclosing a process for producing additives suitable for diesel fuels that improve the cetane number thereof, the feed stock being, for instance, tall oil, tree oil from deciduous trees, anal fats and mixtures thereof. The biomass feed stock is hydroprocessed by contacting with gaseous hydrogen under hydroprocessing conditions in the presence of a catalyst. The product mixture thus obtained is separated into fractions giving a hydrocarbon component that boils in the boiling range of a diesel fuel. Due to poor low temperature performance thereof, the component may not be used at low temperatures.

The document GB 1 524 781 presents a method for producing hydrocarbons from vegetable oil. In this method, the vegetable oil feed stock is pyrolyzed in three zones at temperatures of 300–700° C., in the presence of a catalyst. The hydrocarbons thus obtained are separated and purified.

Biological raw materials contain high amounts of oxygen that is converted to water, carbon monoxide and carbon dioxide during processing. Typically, the amount of water in vegetable oils vanes between 7 and 11% by weight, based on the feed stock Moreover, such biological raw materials often contain nitrogen, sulphur and phosphorus that arc known catalyst poisons and inhibitors inevitably reducing the service life of the catalyst and necessitating frequent regenerations thereof.

Biological starting materials may be pretreated with suitable methods such as thermally, chemically and mechanically prior to the hydrodeoxygenation step that breaks the structure thereof, the step being referred to herein as the HDO step. HDO means removal of oxygen by means of hydrogen, that is, oxygen is removed while breaking the structure of the material. Olefinic double bonds are hydrogenated and any sulphur and nitrogen compounds are removed. Sulphur removal is called hydrodesulphurization (HDS). Pretreatment and purity of the raw materials contribute to the service life of the catalyst.

Generally in the HDO/HDS step, hydrogen is mixed with the feed stock and then the mixture is passed through a catalyst bed as a co-current flow, either as a single phase or a two phase feed stock. After the HDO/MDS step, the product fraction is separated and passed to a separate isomerzation reactor. An isomerization reactor for biological starting material is described in the literature (FI 100 248) as a co-current reactor.

Patent application FI 933982 discloses a process for producing a diesel fuel by hydrogenating a hydrocarbon feed, wherein the feed is passed as a co-current flow with hydrogen gas through a first hydrogenation zone, and thereafter the hydrocarbon effluent is further hydrogenated in a second hydrogenation zone by passing hydrogen gas to the second hydrogenation zone as a counter-current flow relative to the hydrocarbon effluent.

Typically in the HDO step, a NiMo or CoMo catalyst is used, these catalysts having some resistance to catalyst poisons. The reactions in the HDO step are highly exothermic and necessitate high amounts of hydrogen. As for the isomerizing step, noble metal catalysts are used, these catalysts being very expensive and extremely sensitive to catalyst poisons and water. In addition, biological components often give rise to precipitous by-products that may, for instance, cause a considerable pressure drop. So fair, no process configuration for combining the HDO step of the biological starting material and the isomerization process thereof has been proposed in the field for producing high quality diesel components, wherein the properties of the biological raw material are taken into consideration for said configuration.

As on the basis of the above teachings may be seen, there is an obvious need for an improved and simplified process for producing a hydrocarbon component from biological raw materials, problems associated with the prior art solutions being eliminated or at least substantially reduced by said process.

GENERAL DESCRIPTION OF THE INVENTION

An object of the invention is to provide a process for producing a hydrocarbon component from biological raw materials.

An object of the invention is also to provide a process for producing a hydrocarbon component from biological raw materials, said component being suitable as a diesel fuel or as a component thereof.

The process of the invention comprises at least two steps, the first one of which is a HDO step and the second one is an isomerization step utilizing the counter-current principle, a biological raw material serving as the feed stock.

Characteristic features of the process of the invention for producing a hydrocarbon component from biological raw materials are disclosed in the appended claims.

DETAILED DESCRIPTION OF THE INVENTION

It was surprisingly found that the problems of the prior art processes may be avoided or at least substantially reduced by the process of the invention having at least two steps. In the process of the invention, the counter-current flow principle is utilized in connection with a new type of feed stock material. In the first step of the process, i.e. in the hydrodeoxygenation step, hereinafter referred to as the HDO step, the structure of the biological component is decomposed, oxygen, nitrogen, phosphorus and sulphur compounds, and light hydrocarbons as gas are removed, and the olefinic bonds are hydrogenated. In the second step of the process, i.e. in the so-called isomerization step, isomerzation is carried out for branching the hydrocarbon chain and improving the performance of the paraffin at low temperatures.

As the feed stock, a biological raw material containing fatty acids and/or fatty acid esters that originate from plants, animals or fish is used, said biomaterial being selected from the group consisting of vegetable oils/fats, animal fats, fish oils and mixtures thereof. Examples of suitable biomaterials are wood-based and other plant-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk as well as recycled fats of the food industry and mixtures of the above.

The basic structural unit of a typical vegetable or animal fat useful as the feed stock is a triglyceride, that is a triester of glycerol with three fatty acid molecules, having the structure presented in the following formula I:

wherein $R_1$, $R_2$ and $R_3$ are hydrocarbon chains, and $R_1$, $R_2$, and $R_3$ may be saturated or unsaturated $C_6$–$C_{24}$ alkyl groups. The fatty acid composition may vary considerably in feed stocks of different origin.

Mixtures of a biological raw material and hydrocarbon may also serve as the feed, and further, the hydrocarbon component obtained as the product may, if desired, be recycled back to the feed to control the exothermal character of the reactions.

In the first step i.e. HDO stop of the process of the invention, hydrogen gas and the biological component to be hydrogenated are passed to a HDO catalyst bed system either as co-current or counter-current flows, said catalyst bed system comprising one or more catalyst bed(s), preferably 1–3 catalyst beds. The HDO step is typically operated in a co-current manner. In case of a HDO catalyst bed system comprising two or more catalyst beds, one or more of the beds may be operated using the counter-current flow principle. In the HDO step, the pressure varies between 20 and 150 bar, preferably between 50 and 100 bar, and the temperature varies between 200 and 500° C., preferably in the range of 300–400° C. in the HDO step, known hydrogenation catalysts containing metals from Group VII and/or VIB of the Periodic System may be used. Preferably, the hydrogenation catalysts are supported Pd, Pt, Ni, NiMo or a CoMo catalysts, the support being alumina and/or silica, as described for instance in FI 100248. Typically, $NiMo/Al_2O_3$ and $CoMo/Al_2O_3$ catalysts are used.

Prior to the HDO step, the biological raw material may optionally be treated by prehydrogenation under milder conditions thus avoiding side reactions of the double bonds. Such prehydrogenation is carried out in the presence of a prehydrogenation catalyst at temperatures of 50–400° C. and at hydrogen pressures of 1–200 bar, preferably at a temperature between 150 and 250° C. and at a hydrogen pressure between 10 and 100 bar. The catalyst may contain metals from Group VIII and/or VIB of the Periodic System. Preferably, the prehydrogenation catalyst is a supported Pd, Pt, Ni, NiMo or a CoMo catalyst, the support being alumina and/or silica.

Typically, such prehydrogenation is carried out in co-current manner. When the prehydrogenation is almost complete, then white, saturated triglyceride, solid at room temperature and having an iodine number of below 2, is obtained.

A gaseous stream from the HDO step containing hydrogen is cooled and then carbon monoxide, carbon dioxide, nitrogen, phosphorus and sulphur compounds, gaseous light hydrocarbons and other impurities are removed therefrom. After compressing, the purified hydrogen or recycled hydrogen is returned back to the first catalyst bed and/or between the catalyst beds to make up for the withdrawn gas stream. Water is removed from the condensed liquid. The liquid is passed to the first catalyst bed or between the catalyst beds.

In the HDO step, a liquid stream may optionally be withdrawn from between and/or after the catalyst beds. The liquid steam is cooled and water is removed therefrom, and then it is returned back on the catalyst beds.

Optionally, a product from the isomerization step or another suitable hydrocarbon may also be added to the feed of the HDO step.

After the HDO step, the product is subjected to an isomerization step. It is substantial for the process that the impurities are removed as completely as possible before the hydrocarbons are contacted with the isomerization catalyst. The isomerization step comprises an optional stripping step, wherein the reaction product from the HDO step may be purified by stripping with water vapour or a suitable gas such as light hydrocarbon, nitrogen or hydrogen. The optional stripping step is carried out in counter-current manner in a unit upstream of the isomerization catalyst, wherein the gas and liquid are contacted with each other, or before the actual isomerization reactor in a separate stripping unit utilizing counter-current principle.

After the stripping step the hydrogen gas and the hydrogenated biological component, and optionally an n-paraffin mixture, are passed to a reactive isomerization unit comprising one or several catalyst bed(s). The catalyst beds of the isomerization step may operate either in co-current or counter-current manner.

It is essential for the process that the counter-current flow principle is applied in the isomerization step. In the isomerization step this is done by carrying out either the optional stripping step or the isomerization reaction step or both in counter-current manner.

The isomerization step and the HDO step may be carried out in the same pressure vessel or in separate pressure vessels. Optional prehydrogenation may be carried out in a separate pressure vessel or in the same pressure vessel as the HDO and isomerization steps.

In the isomerzation step, the pressure varies in the range of 20–150 bar, preferably in the range of 20–100 bar, the temperature being between 200 and 500° C., preferably between 300 and 400° C.

In the isomerization step, isomerization catalysts known as such may be used, as described e.g. in the document FI 100248. Suitable isomerization catalysts contain molecular sieve and/or a metal from Group VII and/or a carrier. Preferably, the isomerization catalyst contains SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

As the product, a high quality hydrocarbon component of biological origin, useful as a diesel fuel or a component thereof, is obtained, the density, cetane number and performance at low temperate of said hydrocarbon component being excellent.

The invention is now illustrated by means of FIGS. 1–5.

FIGURES

FIG. 1 shows one embodiment of the present invention, schematically illustrating the operation of the process. In the Figure, the HDO step is run in co-current manner and the isomerization step is run in counter-current manner. Both the HDO step and the isomerization step may be cared out in the same pressure vessel or in separate pressure vessels.

Figure 1:
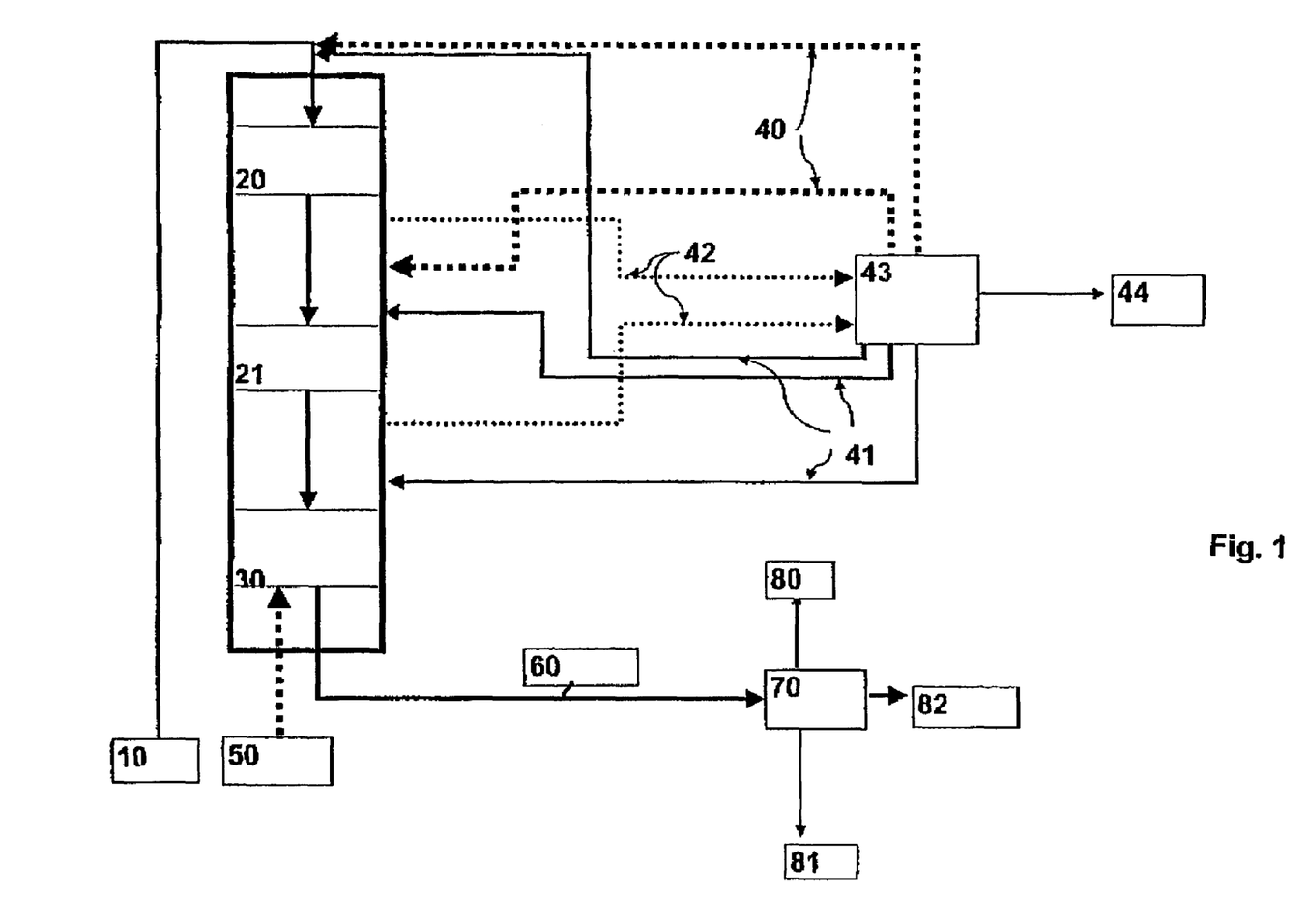
FIG. 1 schematically shows the operation of the process of the invention, wherein the HDO step is run in co-current manner and the isomerization step in counter-current manner.

Biological starting material 10 is passed to a first HDO catalyst bed 20 where condensed hydrocarbon is also passed as a recycled stream 41 having water removed therefrom. Recycled hydrogen 40 is mixed with the feed 10, and the recycled stream 41.

A gas stream 42 is withdrawn both after the last HDO catalyst bed 21 and between the catalyst beds 20 and 21, and further passed to a process unit 43, where said withdrawn gas streams are cooled and partly condensed, water is separated and purified hydrogen gas is compressed to give recycled hydrogen 40. Light hydrocarbons, water, carbon monoxide, carbon dioxide, nitrogen, sulphur and phosphorus compounds and other impurities are removed as stream 44. Condensed hydrocarbons are returned as cooling streams (recycled streams) 41 to suitable catalyst beds. Recycled hydrogen 40 is partitioned between separate catalyst beds.

The product from the HDO step is passed to an isomerization catalyst bed 30 where fresh hydrogen is passed in counter-current manner as a stream 50, the cooling being carried out by means of the stream 41. After the isomerization, the products are passed as a stream 60 to product separation 70 where light components are separated as a stream 80, heavy components as a stream 81 and the hydrocarbon component/biodiesel product as a stream 82.

The presentation of FIG. 1 is also valid for solutions wherein biological raw material is mixed with hydrocarbon. In the solution shown, the HDO step catalyst bed system may comprise one or more beds. In this case, streams withdrawn from between and recycled back to the catalyst beds may be eliminated, or such streams may be provided prior to or after each catalyst bed. In the process unit 43, deleterious organic or inorganic acids may also be removed from the condensed hydrocarbon followed by recycling of the hydrocarbon stream back to the process. The isomerization step may also comprise one or several catalyst beds.

Figure 2:
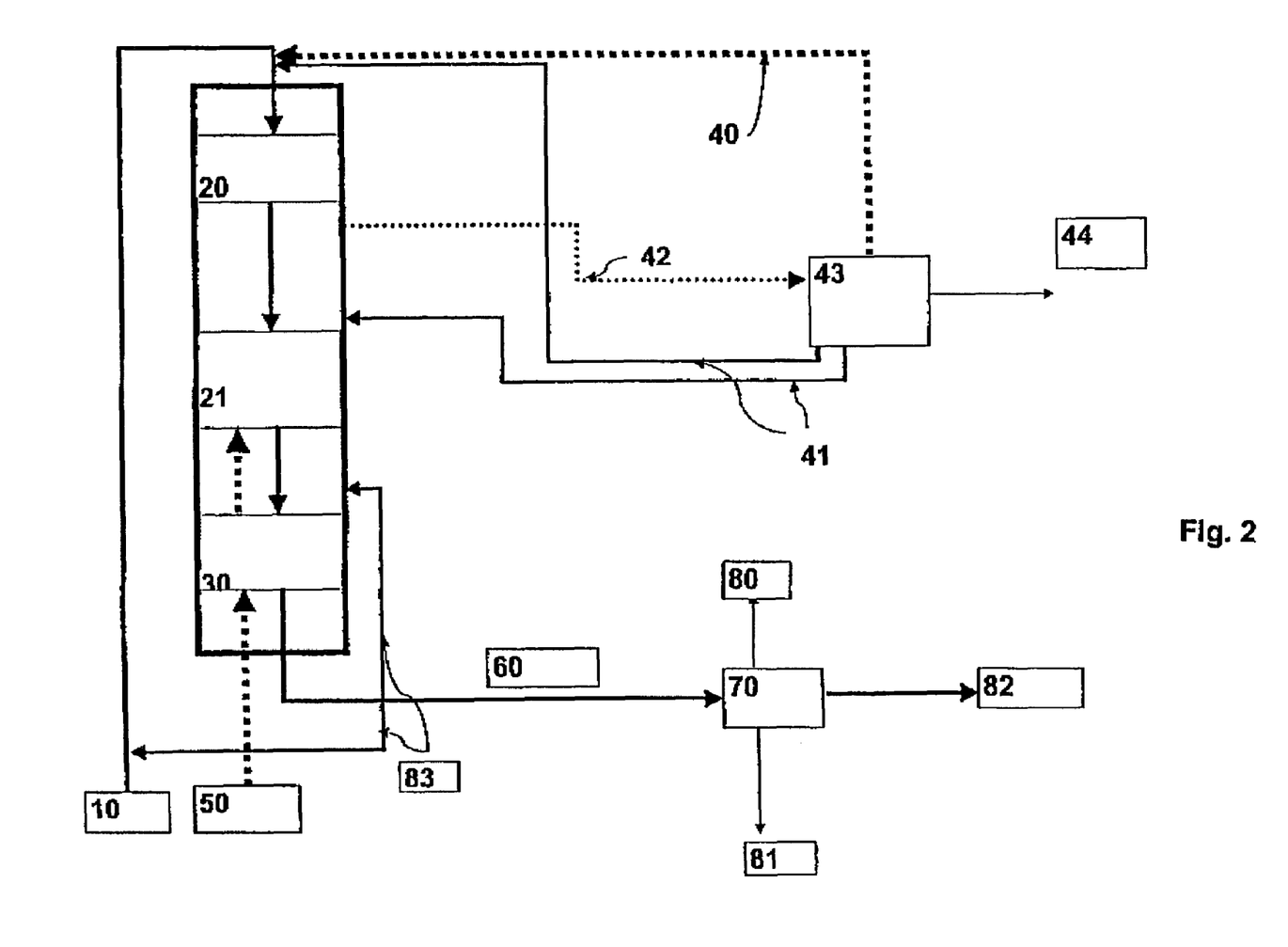
FIG. 2 schematically shows another embodiment of the present invention, wherein the first catalyst bed of the HDO step is shown as co-current and the second as counter-current; the isomerzation step is shown as counter-current.

FIG. 2 shows another embodiment of the invention, schematically illustrating the operation of the process. In the Figure, the first catalyst bed 20 of the HDO step is presented as operated in co-current fashion. After the co current catalyst bed, a counter-current HDO catalyst bed 21 is shown. The isomerization step 30 is shown as operated in counter-current manner.

Biological starting material 10 is passed to the first HDO catalyst bed 20. Condensed hydrocarbon is also passed to the first catalyst bed as a stream 41 having water removed therefrom. Purification and cooling of the withdrawn streams are carried out at a unit 43, and then the streams are returned to the process as in FIG. 1.

Recycled hydrogen 40 is mixed with the feed 10 and with the recycled stream 41. In this embodiment, the feed is also mixed with an isomerization product 83 to dilute the feed to the HDO step. Impurities dissolved in the HDO product are removed therefrom by counter-current HDO bed 21, thus purifying the feed to the isomerization step.

A gas stream 42 is withdrawn upstream of the counter-current HDO catalyst bed 21 and passed to the process unit 43, where withdrawn gas streams are cooled and condensed and purified as described in FIG. 1.

The product from the HDO step is passed to the isomerization catalyst bed, where isomerization is carried out as described in FIG. 1.

The presentation of FIG. 2 is also valid for solutions comprising one or more catalyst bed(s) for the HDO step. In this case, streams withdrawn between the catalyst beds and recycled streams may be eliminated, or such streams may be provided prior to or after each catalyst bed. In the process unit 43, deleterious organic or inorganic acids may also be removed from the condensed hydrocarbon followed by recycling of the hydrocarbon stream back to the process. The isomerzation step may also comprise one or several catalyst beds.

Figure 3:
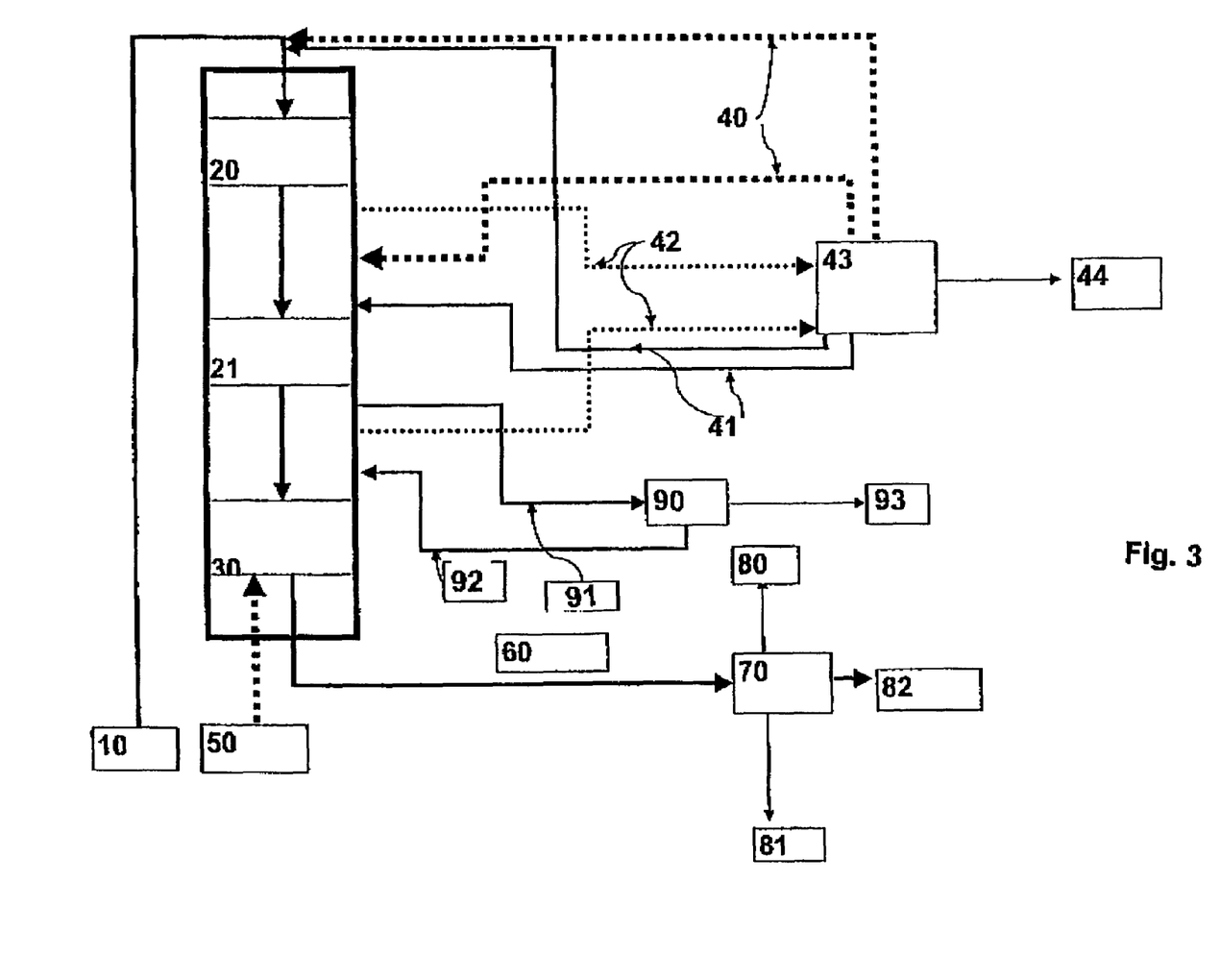
FIG. 3 schematically shows a third embodiment of the present invention illustrating the HDO step as co-current and the isomerization as counter-current. According to the embodiment, after the HDO step, a liquid stream is withdrawn and then purified and returned back to the isomerization step.

FIG. 3 shows still another embodiment of the invention. In the Figure, the HDO step is presented as operated in co-current and the isomerization in counter-current fashion. In this embodiment, a liquid stream is withdrawn downstream of the HDO step, followed by purification of said stream and recycling thereof back to the isomerization step.

This embodiment corresponds to that of FIG. 1 except that a liquid stream 91 is withdrawn downstream of the HDO catalyst bed 21, the stream 91 being passed to a purification step 90 and then, after purification and cooling, it is recycled back to the catalyst bed 30 of the isomerization step as a stream 92. In the purification unit 90, the liquid stream is cooled. Light hydrocarbons, hydrogen, water, carbon monoxide, carbon dioxide, nitrogen, sulphur and phosphorus compounds and other impurities are removed as a stream 93. Hydrocarbons are returned as cooling streams 92 to the catalyst beds of the isomerization step.

The presentation of FIG. 3 is also valid for solutions comprising one or more catalyst bed(s) for the HDO step. In this case, streams withdrawn between the catalyst beds and recycled streams may be eliminated, or such streams may be provided prior to or after each catalyst beds The solution also includes the cases wherein a liquid stream may be withdrawn from various places of the HDO step and returned between other catalyst beds. Hydrogen and other gaseous components separated in the purification step 90 may optionally be passed to the step 43 for purification. In the process step 43 and 90, deleterious organic or inorganic acids may also be removed from the hydrocarbon prior to returning said hydrocarbon stream to the process.

Figure 4:
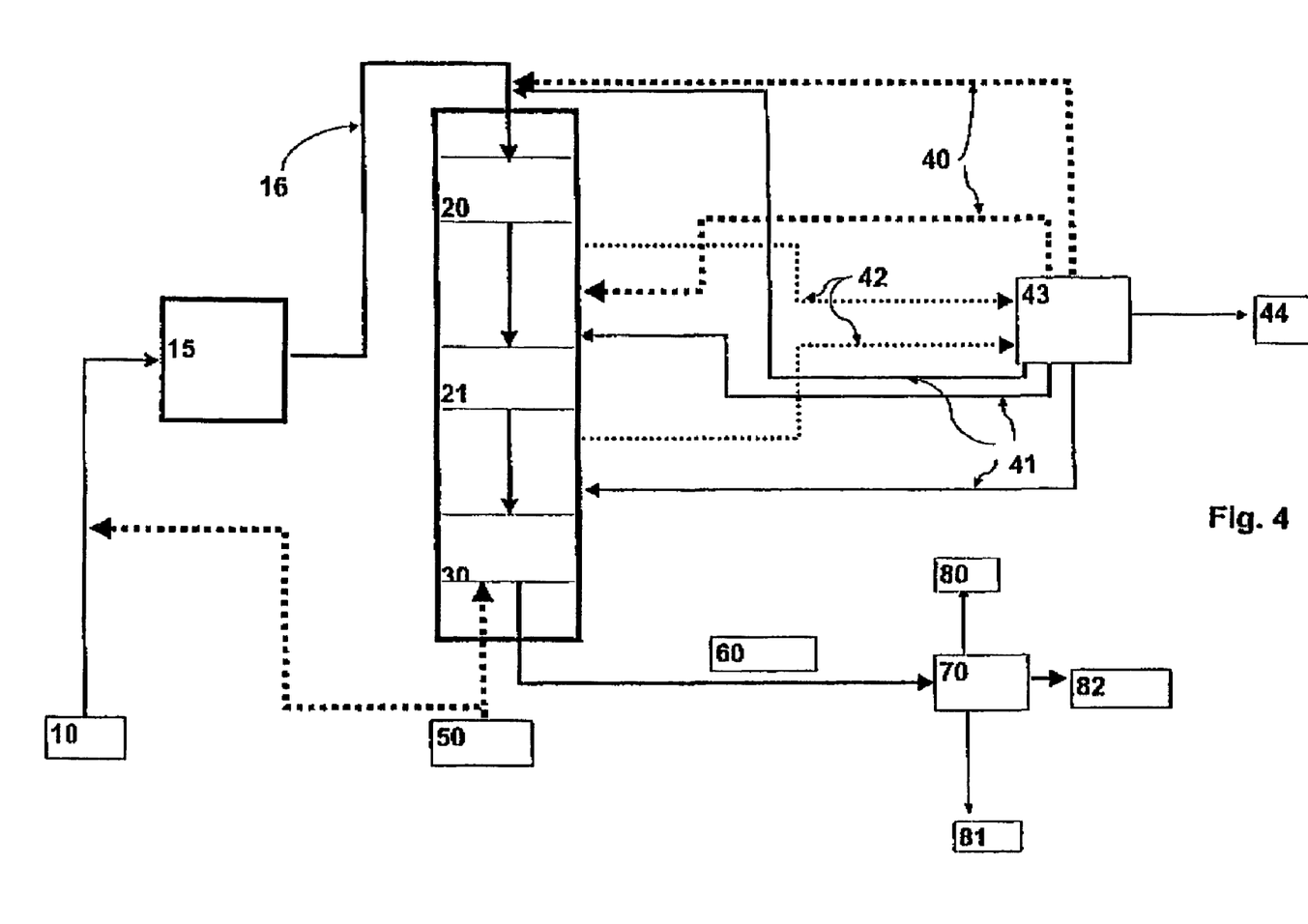
FIG. 4 schematically shows a fourth embodiment of the present invention, comprising prehydrogenation prior to the HDO step.

FIG. 4 shows an embodiment of the invention illustrating a co-current prehydrogenation preceding the HDO step, the HDO step being carried out in co-current manner and the isomerzation step in counter-current manner.

Biological starting material 10 mixed with fresh hydrogen as a stream 50 is passed to a prehydrogenation reactor 15, and thereafter, the prehydrogenated product is passed as a stream 16 from the reactor 15 to a first HDO catalyst bed 20 also receiving as a recycled stream 41 condensed hydrocarbon having water removed therefrom. Recycled hydrogen 40 is mixed with the biological raw material feed 10 and the recycled stream 41. Instead of fresh hydrogen, the biological raw material 10 may also be mixed with recycled hydrogen 40 prior to the prehydrogenation. Typically, the prehydrogenation reactor 15 is a co-current fixed bed reactor.

Downstream of the last HDO catalyst bed 21 and between the catalyst beds 20 and 21, a gas stream 42 is withdrawn and passed to the process step 43, wherein said withdrawn gas streams are cooled and partly condensed, water is separated and the purified hydrogen gas is compressed to give recycled hydrogen 40. Light hydrocarbons, water, carbon monoxide, carbon dioxide, nitrogen, sulphur and phosphorus compounds and other impurities are removed as a stream 44. Condensed hydrocarbons are returned as cooling streams (recycled steams) 41 to suitable catalyst beds. Recycled hydrogen 40 is partitioned between various catalyst beds.

The product from the HDO step is passed to the catalyst bed 30 of the isomerization step also receiving fresh hydrogen in counter-current manner as a stream 50, the cooling being carried out by means of the stream 41. After isomerization, the products are passed as a stream 60 to product separation 70, where light components are separated as a stream 80, heavy components as a stream 81 and the hydrocarbon component/biodiesel product as a stream 82.

FIG. 4 presents an embodiment having the prehydrogenation connected to the embodiment of FIG. 1. The prehydrogenation may also be connected to the embodiments of FIGS. 2 and 3 and to the variations of the above embodiments. The hydrogenation reactor may also be fluidized, have a mobilized bed, be a mixed container reactor of the CSTR type, or a fixed bed counter-current reactor.

Figure 5:
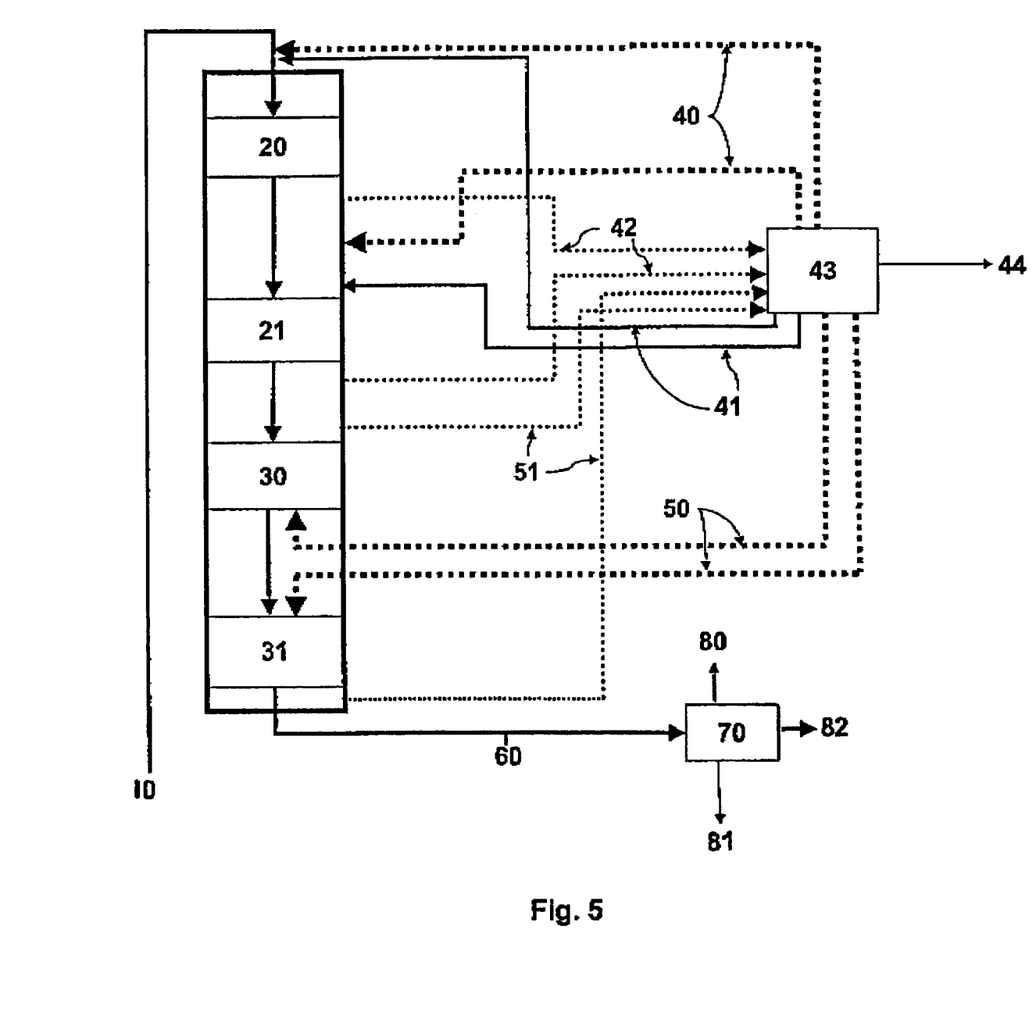
FIG. 5 schematically shows a fifth embodiment of the present invention, wherein both the counter-current and the co-current flow principle are used in the isomerization step

FIG. 5 shows an embodiment schematically illustrating the operation of the process in a situation where part of the isomerization step operates utilizing the co-current flow principle.

Biological starting material 10 is passed to a first HDO catalyst bed 20 where condensed hydrocarbon is also passed as a recycled stream 41 having water removed therefrom. Recycled hydrogen 40 is mixed with the feed 10, and the recycled stream 41.

Downstream of the last HDO catalyst bed 21 and between the catalyst beds 20 and 21, a gas stream 42 is withdrawn and passed to the process step 43, wherein said withdrawn gas streams are cooled and partly condensed, water is separated and the purified hydrogen gas is compressed to give recycled hydrogen 40 and 50. Light hydrocarbons, water, carbon monoxide, carbon dioxide, nitrogen, sulphur and phosphorus compounds and other impurities are removed as a stream 44. Condensed hydrocarbons are returned as cooling streams (recycled streams) 41 to suitable catalyst beds. Recycled hydrogen 40 is partitioned between various catalyst beds.

The product from the HDO step is passed to a stripping unit 30 of the isomerization step where fresh hydrogen is passed in counter-current manner as a stream 50; recycled hydrogen 40 may also optionally be used. The stripping unit 30 may comprise conventional distillation trays or packing and its under part may also contain a catalyst layer. The second part 31 of the isomerization step is carried out in co-current manner and always contains a catalyst layer, Streams 51 containing hydrogen are passed from the isomerization to hydrogen recovery and, if necessary, to be compressed. The fresh hydrogen can be passed to the isomerization unit together with the streams 50.

After isomerization, the products are passed as a stream 60 to product separation 70, where light components are separated as a stream 80, heavy components as a stream 81 and the hydrocarbon component/biodiesel product as a stream 82.

However, it should be appreciated that the invention is not restricted to the embodiments described above or to combinations thereof. There are also other ways than those particularly described above to carry out the invention without deviating from the scope of the appended claims.

In the process of the invention, the counter-current operation can be utilized for processing a novel type of raw material. The co-current operation typically used in the HDO step results in low partial pressure of hydrogen, a great gas stream and poisoning of the catalyst at the downstream end of the catalyst bed. In the HDO step, the poisoning of the catalyst is accelerated by water, carbon monoxide and carbon dioxide. In addition, the nitrogen, sulphur and phosphorus compounds reacted in the HDO step become part of the gaseous phase. Catalyst poisons can be removed by utilizing the counter-current operation in the isomerization and/or HDO step. The service life of the catalysts may be extended both in the HDO step and the isomerization step by removing by-products produced from the withdrawn streams and from the streams to be recycled. The counter-current operation may be carried out in a layer packed with a catalyst, in a layer filled with inert packing or simply by contacting the gas from the latter process steps with the liquid stream from one or more of the preceding process steps.

A major part of the HDO treated product is also vaporized under the conditions of the HDO step. In some cases the amount of the vaporized liquid is so great that the temperature of the reactor may be controlled by withdrawn and recycled streams, or, alternatively, the temperature control may be achieved by extracting liquid from the process, cooling it and returning it to the process. Water is separated from the condensed liquid, water-soluble impurities being entrained therewith. Condensed hydrocarbon may also be purified with conventional methods prior to recycling back to the process. One example is the neutralization of the condensed harmful acids from the hydrocarbon streams and washing with water prior to recycling.

With the optional prehydrogenation step, side reactions of the double bonds such as polymerization, ring formation and aromatization may be reduced, such side reactions causing the catalyst to coke, and thus shortening the operation period. The yield of the final product (diesel) is also considerably improved by the prehydrogenation.

In the isomerization step, gas and liquid move first as counter-current flows to an optional stripping unit. The counter-current operation may also be applied, if necessary, to one or several catalyst beds. This way the valuable noble metal catalyst can be effectively protected, Fresh hydrogen from the isomerization step can be passed directly to the HDO reactor without compression. The isomerization pressure may also be lower than that in the HDO step. In the isomerization, low amounts of hydrogen are consumed meaning that no recycling of hydrogen is necessarily required in the isomerization. Significant savings in the investment costs are possible by placing the HDO and isomerization steps in the same housing.

Advantages of the simplified process of the invention also include the protection of the isomerization catalyst, thus preventing it from deactivating. Due to the counter-current operation principle the water content in the liquid phase is also reduced. Water is removed prior to contacting the hydrocarbon with the isomerization catalyst. This also reduces the deactivation of the isomerization catalyst.

Moreover, it is surprising that the use of a biological feed stock in the process is possible, which feed stock may originate from several different sources, and the composition of the feed may vary considerably without affecting the quality of the end product.

The low temperature performance of the product produced with the process of the invention is considerably better than that of a products obtained using prior art processes. The turbidity point of the product may even be below −30° C., and accordingly, it is also well suited to be used in demanding cold conditions.

The invention is now illustrated with the following examples without, however, intending to limit the scope thereof.

EXAMPLES

Example 1

Production of a hydrocarbon component from tall oil fatty acid fraction (TOFA) using the process of the invention TOFA was used as the feed stock, having the typical characteristics shown in Table 1 below.

TABLE 1

| TOFA (Tall Oil Fatty Acid) | |
|---|---|
| Property | Numerical value |
| Acid number | 194 |
| Saponification number | 195 |
| Resin acids | 1.9% |
| Unsaponified | 2.4% |
| Iodine number (Wijs) | 152 |
| Colour ° G | 4–5 |
| Density (20° C.) | 910 kg/m$^3$ |
| Refractive Index nD20 | 1.471 |
| Fatty acid composition, % (typical) | |
| 16:0 | 0.4 |
| 17:0 ai | 0.6 |
| 18:0 | 1.1 |
| 18:1 (9) | 30.2 |
| 18:1 (11) | 1.1 |
| 18:2 (5, 9) | 1.0 |
| 18:2 (9, 12) | 41.7 |

TABLE 1-continued

| TOFA (Tall Oil Fatty Acid) | |
|---|---|
| Property | Numerical value |
| 19:1 (9) ai | 0.6 |
| 18:3 (5, 9, 12) | 9.0 |
| 19:2 (5, 9) ai | 0.3 |
| 19:2 (9, 12) ai | 0.3 |
| 18:3 (9, 12, 15) | 0.6 |
| 20:0 | 0.4 |
| 18:2 conjug. | 5.5 |
| 18:3 conjug | 2.1 |
| 20:2 (11, 14) | 0.2 |
| 20:3 (5, 11, 14) | 1.1 |
| 20:3 (7, 11, 14) | 0.2 |
| Others | 3.6 |
| Total | 100.0 |

HDO Step

In the HDO step, the TOFA was hydrogenated using the typical desulphurization catalyst NiMo/Al$_2$O$_3$ of middle distillates. Aqueous phase formed in an amount of about 10% by weight was separated from the product.

Isomerization Step

The catalyst was prepared using a typical process for producing a catalyst, and then ground and sieved. The catalyst was loaded to a tubular reactor and reduced at normal pressure with a hydrogen stream at 350–450° C. for one hour. The catalyst was cooled to the temperature of 150° C. prior to pressurization and starting the hydrogenated TOFA feed. The isomerization conditions were as follows: temperature 250–400° C.; hydrogen pressure: 50 bar, feed flow rate: WHSV=3 l/h; and hydrogen flow rate H$_2$HC=500 l/h.

Table 2 below shows the properties of the hydrocarbon component obtained with the process, that is, the properties of the TOFA obtained after the HDO and isomerzation steps.

TABLE 2

| The properties of the processed TOFA | | | |
|---|---|---|---|
| Analysis | | Method ASTM | Processed TOFA |
| Density 50° C. | kg/m$^3$ | D4052 | 769.7 |
| Sulphur | mg/kg | D4294 | 0 |
| Br-index | — | D2710 | 200 |
| Turbidity point | ° C. | D2500 | −12 |
| Solidification point | ° C. | D97 | −12 |
| Filterability | ° C. | EN116 | −11 |
| Distillation | TA/° C. | D86 | 122 |
| | 5 ml/° C. | | 268 |
| | 10 ml/° C. | | 280 |
| | 30 ml/° C. | | 295 |
| | 50 ml/° C. | | 297 |
| | 70 ml/° C. | | 299 |
| | 90 ml/° C. | | 304 |
| | 95 ml/° C. | | 314 |
| | TL/ml/° C. | | 342 |
| Cetane number | — | D643 | >74 |
| n-Paraffins | % by weight | GC-MS | 13 |
| i-Paraffins | % by weight | GC-MS | 73 |

The properties of TOFA processed according to the invention are excellent. The performance at low temperature is considerably improved by the isomerization without decreasing the cetane number. The product is very suitable as a component in diesel fuels without any blending restrictions, and it is also useful in solvents.

EXAMPLE 2

Prehydrogenation according to the invention of alkali-refined rapeseed oil

Prehydrogenation were carried out in an autoclave at the temperature of 100–290° C. and at the pressure of 30–35 bar. Alkali-refined rapeseed oil served as the feed stock. Table 3 shows some properties of the rapeseed oil feed and the prehydrogenated product. As may be seen from the properties of the prehydrogenated product, the triglyceride composition remains nearly unchanged (GPC=gel permeation chromatography) and the double bonds of the fatty acid chains are nearly completely saturated (iodine number).

TABLE 3

Properties of the prehydrogenated product

| Analysis | Rapeseed oil feed | Prehydrogenated product/150° C. | Prehydrogenated product/250° C. |
|---|---|---|---|
| GPC analysis | | | |
| oligomers, % | 0 | 0 | 0.2 |
| triglycerides, % | 97 | 95.9 | 94.9 |
| diglycerides, % | 2.3 | 3.1 | 3.5 |
| monoglycerides, % | 0 | 0 | 0 |
| fatty acids or hydrocarbons, % | 0.7 | 0.9 | 1.3 |
| Iodine number | 112 | 1 | 2 |

The invention claimed is:

1. A process for producing a hydrocarbon component of biological origin, comprising:
   providing a biological component to be hydrogenated;
   subjecting the biological component to be hydrogenated to prehydrogenation prior to the hydrodeoxygenation step;
   hydrodeoxygenating the biological component; and
   subjecting the hydrodeoxygenated biological component to isomerization, wherein
   the isomerization step operates using the counter-current flow principle, and wherein
   the biological component comprises fatty acids and/or fatty acid esters.

2. The process according to claim 1, wherein the biological component comprises vegetable oils, vegetable fats, animal fats, fish oils and mixtures thereof.

3. The process according to claim 1, wherein the biological component comprises wood-based or plant-based fats and oils, fats contained in plants bred by means of gene manipulation, animal-based fats, recycled fats of the food industry or mixtures of the above.

4. The process according to claim 3, wherein the biological component comprises rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train oil or fats contained in milk.

5. The process according to claim 1 wherein the biological component to be hydrogenated is mixed with one or more hydrocarbons.

6. The process according to any of the above claims 1–5, wherein hydrogen gas and the biological component to be hydrogenated are passed to a hydrodeoxygenation catalyst bed system either as co-current or as counter-current flows during the hydrodeoxygenation step.

7. The process according to claim 6, wherein the hydrodeoxygenation catalyst bed system comprises one or more catalyst beds.

8. The process according to claim 7, wherein the hydrodeoxygenation catalyst bed system comprises two or more catalyst beds, one or more of which are operated using the counter-current flow principle.

9. The process according to claim 8, wherein the pressure during the hydrodeoxygenation step is from 20 to 150 bar, and the temperature is from 200 to 500° C.

10. The process according to claim 9, further comprising a step of cooling the hydrocarbon gas produced by the hydrodeoxygenation step, purifying the hydrocarbon gas by removing impurities therefrom, and recycling the purified gas back to the hydrodeoxygenation or isomerization step.

11. The process according to claim 10, wherein the hydrocarbon gas is condensed by cooling and water is removed from the hydrocarbon prior to recycling it back to the hydrodeoxygenation step.

12. The process according to claim 11, wherein a liquid stream is withdrawn from the process downstream of one or several catalyst bed(s) of the hydrodeoxygenation step.

13. The process according to claim 12, wherein the hydrodeoxygenated biological component and hydrogen gas are passed as counter-current flows to the isomerization step.

14. The process according to claim 13, wherein the isomerization step is carried out in a stripping unit and the component to be hydrogenated counter-currently is passed to the stripping unit in order to remove catalyst poisons therefrom.

15. The process according to claim 14, wherein the pressure during the isomerization step is from 20 to 150 bar, and the temperature is from 200 to 500° C.

16. The process according to claim 15, wherein the hydrodeoxygenation and the isomerization steps are carried out in the same pressure vessel.

17. The process according to claim 1, wherein the prehydrogenation step is carried out at a hydrogen pressure of 1–200 bar and at a temperature of 50–400° C.

18. The process according to claim 1, wherein the prehydrogenation is carried out in the same pressure vessel as the hydrodeoxygenation and isomerization steps.

19. The process according to claim 1, wherein the prehydrogenation and hydrodeoxygenation steps are carried out in the presence of a hydrogenation catalyst.

20. The process according to claim 19, wherein the hydrogenation catalyst is a supported Pd, Pt, Ni, NiMo or a CoMo catalyst, the support being alumina and/or silica.

21. The process according to claim 1, wherein an isomerization catalyst is used in the isomerization step, and the isomerization catalyst contains molecular sieve.

22. The process according to claim 21, wherein a metal from the Element Group VIII has been added to the isomerization catalyst.

23. The process according to claim 21, wherein the isomerization catalyst contains $Al_2O_3$ or $SiO_2$.

24. The process according to claim 21, wherein the isomerization catalyst contains one or more of SAPO-11, SAPO-41, ZSM-22, ZSM-23, ferrierite, Pt, Pd, Ni, $Al_2O_3$ and $SiO_2$.

25. The process according to claim 1, further comprising a stripping step after the isomerization step.

26. The process according to claim 9, wherein the pressure during the hydrodeoxygenation step is from 50 to 100 bar and the temperature is from 300 to 400° C.

27. The process according to claim 12, wherein the liquid stream is cooled and purified by removing water and water soluble impurities therefrom and the purified liquid stream is recycled back to the hydrodeoxygenation or isomerization step.

28. The process according to any one of claims 13 or 14, wherein a hydrocarbon mixture is added to the hydrodeoxygenated biological component and hydrogen gas.

29. The process according to claim 15, wherein the pressure during the isomerization step is from 20 to 100 bar and the temperature is from 300 to 400° C.

30. The process according to claim 15, wherein the pressure in the isomerization step is higher than the pressure in the hydrodeoxygenation step.

31. The process according to claim 15, wherein the hydrodeoxygenation and the isomerization steps are carried out in separate pressure vessels.

32. The process according to claim 17, wherein the prehydrogenation step is carried out at a hydrogen pressure of 10–100 bar and at a temperature of 150–200° C.

33. The process according to claim 17, wherein the prehydrogenation, hydrodeoxygenation and isomerization steps are carried out in separate pressure vessels.

34. The process according to claim 19, wherein the hydrogenation catalyst comprises a metal from the Group VIII of the Periodic System.

35. The process according to claim 19, wherein the hydrogenation catalyst comprises a metal from the Group VIB of the Periodic System.

* * * * *

(12) EX PARTE REEXAMINATION CERTIFICATE (7107th)
United States Patent
Jakkula et al.

(10) Number: US 7,232,935 C1
(45) Certificate Issued: Oct. 13, 2009

(54) PROCESS FOR PRODUCING A HYDROCARBON COMPONENT OF BIOLOGICAL ORIGIN

(75) Inventors: Juha Jakkula, Kerava (FI); Vesa Niemi, Porvoo (FI); Jouko Nikkonen, Hamari (FI); Veli-Matti Purola, Hamari (FI); Jukka Myllyoja, Vantaa (FI); Pekka Aalto, Porvoo (FI); Juha Lehtonen, Porvoo (FI); Ville Alopaeus, Helsinki (FI)

(73) Assignee: Fortum OYJ, Espoo (FI)

Reexamination Request:
No. 90/008,899, Nov. 5, 2007

Reexamination Certificate for:
Patent No.: 7,232,935
Issued: Jun. 19, 2007
Appl. No.: 10/655,533
Filed: Sep. 5, 2003

Related U.S. Application Data (60) Provisional application No. 60/408,301, filed on Sep. 6, 2002.

(51) Int. Cl.
*C07C 1/02* (2006.01)

(52) U.S. Cl. .................. 585/240; 208/179; 585/241
(58) Field of Classification Search .................. None
See application file for complete search history.

(56) References Cited

U.S. PATENT DOCUMENTS

| | | | |
|---|---|---|---|
| 3,929,615 A | 12/1975 | Linden et al. | |
| 4,960,960 A | 10/1990 | Harrison et al. | |
| 4,992,605 A | 2/1991 | Craig et al. | |
| 5,092,908 A * | 3/1992 | Feldman et al. | 44/380 |
| 5,093,535 A | 3/1992 | Harrison et al. | |
| 5,158,982 A | 10/1992 | Stapp | |
| 5,578,090 A | 11/1996 | Bradin | |
| 5,578,091 A | 11/1996 | Jackson et al. | |
| 5,705,722 A | 1/1998 | Monnier et al. | |
| 5,814,109 A | 9/1998 | Cook et al. | |
| 5,861,441 A | 1/1999 | Waycuilis | |
| 5,882,505 A | 3/1999 | Wittenbrink et al. | |
| 5,888,376 A | 3/1999 | Wittenbrink et al. | |
| 5,906,729 A | 5/1999 | Chou | |
| 6,123,835 A | 9/2000 | Ackerson et al. | |
| 6,174,501 B1 | 1/2001 | Noureddini | |
| 2002/0027937 A1 | 3/2002 | Govorkov et al. | |
| 2007/0068848 A1 | 3/2007 | Monnier et al. | |

FOREIGN PATENT DOCUMENTS

| | | |
|---|---|---|
| CA | 1313200 | 1/1993 |
| CA | 2149685 | 12/1995 |
| CA | 2400944 | 8/2001 |
| CA | 2316141 | 2/2002 |
| CZ | 283575 | 2/1998 |
| DE | 4116905 | 8/1992 |
| EP | 1396531 A2 | 3/2004 |
| FI | 933982 | 9/1993 |
| FI | 100248 B | 8/1997 |
| GB | 1002922 | 9/1965 |
| GB | 2090611 | 7/1982 |
| IE | 921671 | 12/1995 |
| SE | 9700149 | 8/1997 |
| WO | WO-92/16601 | 10/1992 |
| WO | WO-95/25152 | 9/1995 |

(Continued)

OTHER PUBLICATIONS

Ribamar et al., "Vegetable Oil Catalytic Breakdown", Petrobras Technical Bulletin, Rio de Janeiro, 24 (2): 139–147, Apr./Jun. 1981.

(Continued)

*Primary Examiner*—Jerry D. Johnson (57) ABSTRACT

The invention relates to a process for producing a hydrocarbon component of biological origin. The process comprises at least two steps, the first one of which is a HDO step and the second one is an isomerization step operated using the counter-current flow principle. A biological raw material containing fatty acids and/or fatty acid esters serves as the feed stock.

FOREIGN PATENT DOCUMENTS

| WO | WO-98/56876 | 12/1998 |
|----|----|----|
| WO | WO-01/12581 | 2/2001 |
| WO | WO-01/49812 | 7/2001 |
| WO | WO-03/022960 | 3/2003 |
| WO | WO-2007/033460 | 3/2007 |

OTHER PUBLICATIONS

Ribamar et al., "Catalytic Decomposition of Vegetable Oil", Applied Catalysis, vol. 5, 1993, pp. 299–308.

Huve, "Shell Global Solutions Dewaxing Technologies & Catalysts Current Status,".

Nunes et al., "Soybean Oil Hydrocracking Under Pressure: Process and General Aspect of the Transformation," Revue De L'institut Francais Du Petrole, vol. 42, No. 3, May–Jun. 1986.

Cecchi et al., "Coversion of Vegetable Oils Into Potential Fuels. Preliminary Trial.", Revue Francaise Des Corps Gras. vol. 34, No. 9, Sep. 1897, pp. 397–401.

Bauldauf et al., "Processing of Vegetable Oil to Fuels in Mineral Oil Refinery Processes", VDE Reports, No. 1126 (1994) pp. 153–168.

Gusmão, J. et al. "Utilization of vegetable oils as an alternative source for diesel–type fuel: hydrocracking on reduced Ni/SiO2 and sulphided Ni–Mo/yAl2O3," *Catalysis Today*, v. 5, pp. 533–544, 1989.

Stumborg et al., "Hydroprocessed vegetable oils for diesel fuels improvement", Bioresource Technology, vol. 56, 1996, pp. 13–18, Exhibit M of Request for Reexamination of U.S. Patent 7,279,018.

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 49–67:

In the first step i.e, HDO stop of the process of the invention, hydrogen gas and the biological component to be hydrogenated are passed to a HDO catalyst bed system either as co-current or counter-current flows, said catalyst bed system comprising one or more catalyst bed(s), preferably 1–3 catalyst beds. The HDO step is typically operated in a co-current manner. In case of a HDO catalyst bed system comprising two or more catalyst beds, one or more of the beds may be operated using the counter-current flow principle. In the HDO step, the pressure varies between 20 and 150 bar, preferably between 50 and 100 bar, and the temperature varies between 200 and 500° C., preferably in the range of 300–400° C. in the HDO step, known hydrogenation catalysts containing metals from [Group VII] *Group VIII* and/or VIB of the Periodic System may be used. Preferably, the hydrogenation catalysts are supported Pd, Pt, Ni, NiMo or a CoMo catalysts, the support being alumina and/or silica, as described for instance in Fl 100248. Typically NiMo/Al$_2$O$_3$ and CoMo/Al$_2$O$_3$ catalysts are used.

Column 5, lines 1–9:

In the isomerization step, isomerization catalysts known as such may be used, as described e.g. in the document Fl 100248. Suitable isomerization catalysts contain molecular sieve and/or a metal from [Group VII] *Group VIII* and/or a carrier. Preferably, the isomerization catalyst contains SAPO-11 or SAPO41 or ZSM-22 or ZSM-23 or ferrierite and Pt, Pd or Ni and Al$_2$O$_3$ or SiO$_2$. Typical isomerization catalysts are, for example, Pt/SAPO-11/Al$_2$O$_3$, Pt/ZSM-22/Al$_2$O$_3$, Pt/ZSM-23/Al$_2$O$_3$ and Pt/SAPO-11/SiO$_2$.

AS A RESULT OF REEXAMINATION, IT HAS BEEN DETERMINED THAT:

Claims 1, 9, 17 and 32 are cancelled.

Claims 2–6, 10, 15, 16, 18, 19, 21, 22, 25, 26, 28, 29, and 33 are determined to be patentable as amended.

Claims 7, 8, 11–14, 20, 23, 24, 27, 30, 31, 34 and 35, dependent on an amended claim, are determined to be patentable.

New claims 36–48 are added and determined to be patentable.

2. The process according to [claim 1] *claim 36 or 37*, wherein the biological component comprises vegetable oils, vegetable fats, animal fats, fish oils and mixtures thereof.

3. The process according to [claim 1] *claim 36 or 37*, wherein the biological component comprises wood-based or plant-based fats and oils, fats contained in plants bred by means of gene manipulation, animal-based fats, recycled fats of the food industry or mixtures of the above.

4. The process according to [claim 3] *claim 36 or 37*, wherein the biological component comprises rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train oil or fats contained in milk.

5. The process according to [claim 1] *claim 2* wherein the biological component to be hydrogenated is mixed with one or more hydrocarbons.

6. The process according to [any of the above claims 1–5] *claim 2*, wherein hydrogen gas and the biological component to be hydrogenated are passed to a hydrodeoxygenation catalyst bed system as co-current or as counter-current flows during the hydrodeoxygenation step.

10. The process according to [claim 9] *claim 6*, further comprising a step of cooling the hydrocarbon gas produced by the hydrodeoxygenation step, purifying the hydrocarbon gas by removing impurities therefrom, and recycling the purified gas back to the hydrodeoxygenation or isomerization step.

15. The process according to [claim 14] *claim 36*, wherein the pressure during the isomerization step is from 20 to 150 bar, and the temperature is from 200 to 500° C.

16. The process according to [claim 15] *claim 36 or 37*, wherein the hydrodeoxygenation and the isomerization steps are carried out on the same pressure vessel.

18. The process according to [claim 1] *claim 36 or 37*, wherein the prehydrogenation is carried out in the same pressure vessel as the hydrodeoxygenation and isomerization steps.

19. The process according to [claim 1] *claim 36 or 37*, wherein the prehydrogenation and hydrodeoxygenation steps are carried out in the presence of a hydrogenation catalyst.

21. The process according to [claim 1] *claim 36 or 37*, wherein an isomerization catalyst is used in the isomerization step, and the isomerization catalyst contains molecular sieve.

22. The process according to claim 21, wherein [a metal from the Element Group VIII has been added to] the isomerization catalyst *further comprises a metal from Group VIII*.

25. The process according to [claim 1] *claim 36 or 37*, further comprising a stripping step after the isomerization step.

26. The process according to [claim 9] *claim 36*, wherein the pressure during the hydrodeoxygenation step is from 50 to 100 bar [and the temperature is from 300 to 400° C.].

28. The process according to [any one of claims 13 or 14] *claim 13*, wherein a hydrocarbon mixture is added to the hydrodeoxygenated biological component and hydrogen gas.

29. The process according to [claim 15] *claim 36*, wherein the pressure during the isomerizaton step is from 20 to 100 bar and the temperature is from 300 to 400° C.

33. The process according to [claim 17] *claim 36 or 37*, wherein the prehydrogenation, hydrodeoxygenation and isomerization steps are carried out in separate pressure vessels.

*36. A process for producing a hydrocarbon component of biological original comprising:*

*a) prehydrogenating a biological component at a temperature of 150–250° C. and a pressure of 10–100 bar;*

*b) hydrodeoxygenating the product of step a) at a temperature of 300–400° C. and a pressure of 20–150 bar; and*

*c) isomerizing the product of step b),*

*wherein the isomerization step operates using the counter-current flow principle, and the biological component comprises fatty acids and/or fatty acid esters.*

*37. A process for producing a hydrocarbon component of biological original, comprising:*

*a) prehydrogenating a biological component at a temperature of 150-250° C. and a pressure of 10-100 bar;*

*b) hydrodeoxygenating the product of step a) at a temperature of 300–400° C. and a pressure of 50–100 bar; and*

*c) isomerizing the product of step b)at a temperature of 300–400° C. and a pressure of 20–100 bar,*

*wherein the isomerization step operates using the counter-current flow principle, and the biological component comprises fatty acids and/or fatty acid esters.*

*38. The process according to claim 36 or 37, further comprising a stripping step.*

*39. The process according to claim 36 or 37, wherein said component of biological origin is from animal fat or fish oil.*

*40. A process for producing diesel fuel or a component of diesel fuel, comprising:*

*a) prehydrogenating a biological component from animal fat or fish oil at a temperature of 150–250° C. and a pressure of 10–100 bar;*

*b) hydrodeoxygenating the product of step a) at a temperature of 300–400° C. and a pressure of 20–150 bar; and*

*c) isomerizing the product of step b),*

*wherein the isomerization step operates using the counter-current flow principle, and the biological component comprises fatty acids and/or fatty acid esters.*

*41. The process according to claim 40, wherein said isomerization step is conducted at a temperature of 300–400° C. and a pressure of 20–100 bar.*

*42. The process according to claim 41, further comprising a stripping step with water vapor, a light hydrocarbon, nitrogen or hydrogen.*

*43. The process according to claim 40, wherein hydrogen gas and the biological component to be hydrogenated are passed to a hydrodeoxygenation catalyst bed system either as co-current or as counter-current flows during the hydrodeoxygenation step.*

*44. The process according to claim 43, further comprising a step of cooling the hydrocarbon gas produced by the hydrodeoxygenation step, purifying the hydrocarbon gas by removing impurities therefrom, and recycling the purified gas back to the hydrodeoxygenation or isomerization step.*

*45. The process according to claim 44, wherein the hydrocarbon gas is condensed by cooling and water is removed from the hydrocarbon prior to recycling it back to the hydrodeoxygenation step.*

*46. The process according to claim 41, wherein (a) the prehydrogenation and hydrodeoxygenation steps are carried out in the presence of a hydrogenation catalyst; (b) the hydrogenation catalyst is a supported Pd, Pt, Ni, NiMo or a CoMo catalyst, the support being alumina and/or silica; and (c) an isomerization catalyst is used in the isomerization step, wherein the isomerization catalyst contains molecular sieve and wherein the isomerization catalyst further comprises a metal from Group VIII.*

*47. The process according to claim 46, wherein the isomerization catalyst contains $Al_2O_3$ or $SiO_2$.*

*48. The process according to claim 46, wherein the isomerizaton catalyst contains one or more of SAPO-11, SAPO-41, ZSM-22, ZSM-23, ferrierite, Pt, Pd, Ni, $Al_2O_3$ and $SiO_2$.*

\* \* \* \* \*